United States Patent
Keller

(10) Patent No.: US 10,708,156 B2
(45) Date of Patent: Jul. 7, 2020

(54) EVENT-TRIGGERED, GRAPH-CENTRIC PREDICTIVE CACHE PRIMING

(71) Applicant: CA, Inc., New York, NY (US)

(72) Inventor: Adam George Keller, Lee, NH (US)

(73) Assignee: CA, Inc., New York, NY (US)

( * ) Notice: Subject to any disclaimer, the term of this patent is extended or adjusted under 35 U.S.C. 154(b) by 878 days.

(21) Appl. No.: 14/959,031

(22) Filed: Dec. 4, 2015

(65) Prior Publication Data
US 2017/0163506 A1    Jun. 8, 2017

(51) Int. Cl.
G06F 15/173    (2006.01)
H04L 12/26     (2006.01)

(52) U.S. Cl.
CPC ............. H04L 43/08 (2013.01); H04L 43/16 (2013.01)

(58) Field of Classification Search
CPC ................................ H04L 43/08; H04L 43/16
See application file for complete search history.

(56) References Cited

U.S. PATENT DOCUMENTS

| 6,721,780 B1* | 4/2004 | Kasriel | H04L 67/2847 709/203 |
|---|---|---|---|
| 2005/0210132 A1* | 9/2005 | Florissi | G06Q 10/00 709/224 |
| 2016/0004571 A1* | 1/2016 | Smith | G06F 16/285 718/105 |

* cited by examiner

Primary Examiner — Suraj M Joshi
Assistant Examiner — Jaren Means
(74) Attorney, Agent, or Firm — Foley & Lardner LLP

(57) ABSTRACT

Notification of an event related to a performance degradation in a network node of a plurality of network nodes in a network is received. The notification is forwarded to a client device. Cache priming is performed based, at least in part, on a network graph that defines connectivity among at least some of the plurality of network nodes. Cache priming includes determining a set of impacted network nodes of the plurality of network nodes that is impacted by the performance degradation based on the connectivity defined by the network graph. Cache priming includes reducing the set of impacted network nodes to a subset of the impacted network nodes. Cache priming also includes retrieving from a persistent data storage device, data defining the subset of the impacted network nodes and storing the data defining the subset of the impacted network nodes in a memory.

20 Claims, 6 Drawing Sheets

EVENT-TRIGGERED, GRAPH-CENTRIC PREDICTIVE CACHE PRIMING

BACKGROUND

The disclosure generally relates to the field of data processing, and more particularly to event-triggered, graph-centric predictive cache priming.

Management and monitoring of network nodes (various devices for data transmission) in a network can be performed by different Application Programming Interface (API) services executing on one or more client devices. The API services can monitor different events that occur in the network (e.g., a network node outage, performance degradation at a network node, etc.). The API services can also receive notification of the different events and perform various corrective actions (e.g., initiate a restart of a network node, rerouting of network traffic, etc.).

BRIEF DESCRIPTION OF THE DRAWINGS

Embodiments of the disclosure may be better understood by referencing the accompanying drawings.

DESCRIPTION

Figure 1:
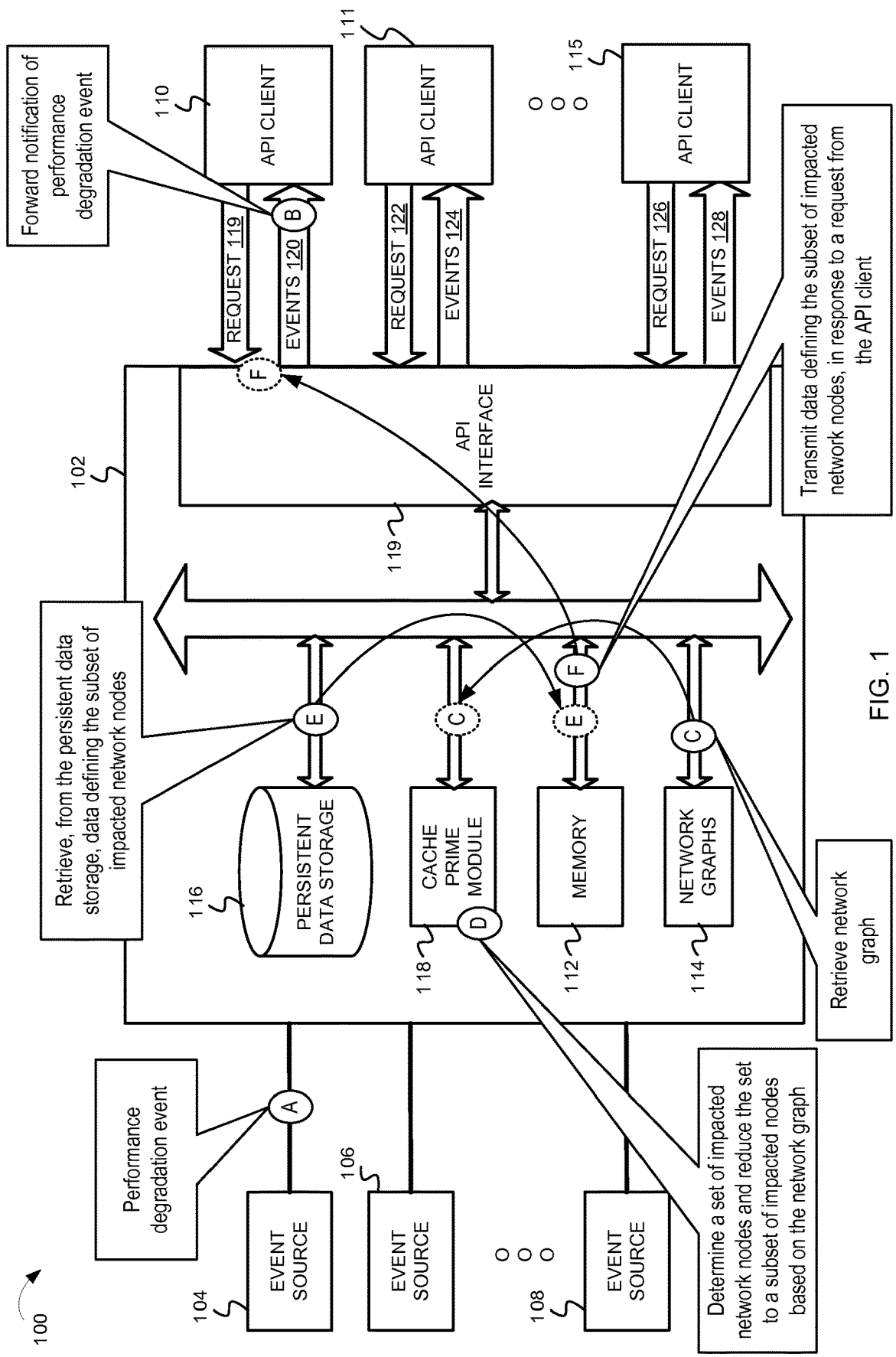
FIG. 1 depicts a system having event-triggered graph centric predictive cache priming, according to some embodiments.

The description that follows includes example systems, methods, techniques, and program flows that embody embodiments of the disclosure. However, it is understood that this disclosure may be practiced without these specific details. For instance, this disclosure refers to performing predictive cache priming in response to performance degradation events occurring in a network node in illustrative examples. But aspects of this disclosure can be applied to any other events in a network. In other instances, well-known instruction instances, protocols, structures and techniques have not been shown in detail in order not to obfuscate the description.

Overview

Some embodiments provide predictive cache priming in response to network events and based on network graphs. Predictive cache priming includes copying data from a persistent data storage device to a memory in anticipation of being accessed by an application, device, component, etc. (prior to the actual access). More generally, predictive cache priming can be defined as copying of data from a first data storage to a second data storage in anticipation of being accessed by an application, device, component, etc., wherein accessing of data from the second data storage is faster than access of data from the first data storage. A persistent data storage device can be a hard disk drive, such as magnetic storage device. A memory can be different types of writable memory, such as Random Access Memory (RAM), FLASH, cache, etc.

In some embodiments, predictive cache priming is triggered in response to different types of events. An example of an event can include some type of performance degradation of a component, device, etc. in a network node of a network. Another example of an event can include an outage of a network node. A network node can be any type of device configured to transmit and/or receive data from another network node in a network. For example, a network node can be a router, server, modem, bridge, hub, host computer, client device, etc. Examples of performance degradation of a network node can include a high memory usage or a high processor usage, a reduction in throughput, one or more data buffers at the output ports exceeding defined thresholds, outage of a defined number of input or output ports, etc.

In some embodiments, predictive cache priming incorporates use of a network graph that defines the network nodes and their connectivity among each other in a network. The graph includes the network node where the event occurred (the immediately affected node) and other network nodes affected by the event. An event's impact scope on network nodes can be determined using the graph based on connectivity between the immediately affected network node and other potentially affected nodes.

Determination of the event's impact scope, if unbounded, could consume the entire graph. Therefore, in some embodiments, the impact scope is narrowed based on size of the memory used for the predictive cache priming, attributes relevant to the problem domain that would help constrain the impact scope, etc. Examples of attributes to constrain the event's impact scope can include the type of device triggering the event, the type of network node that includes the device triggering the event, the type of performance degradation, etc.

After the impact scope is defined, network nodes within the impact scope are determined (impacted network nodes). Then, predictive cache priming can be executed to retrieve data related to this group of impacted network nodes. In particular, data that defines any relevant attributes, activities, etc. of the impacted network nodes is retrieved from one or more persistent data storage devices and stored in memory. This data in memory is then more quickly accessible by client devices that may be requesting such data for additional context, correction, etc. that is relevant to the event. In response to the client devices requesting this data defining the group of impacted network nodes, the data can be served from memory instead of a slower persistent data storage device.

Example System

FIG. 1 depicts a system having event-triggered graph centric predictive cache priming, according to some embodiments. A system 100 includes a device 102, a number of event sources (an event source 104, an event source 106, and an event source 108), and a number of API clients (an API client 110, an API client 111, and an API client 115). The device 102 is communicatively coupled to receive notification of events from the event source 104, the event source 106, and the event source 108. The device 102 is also communicatively coupled to the API client 110, the API client 111, and the API client 115.

The device 102 can be any type of device, computer, server, etc. configured to perform a predictive caching based on a network graph (as described herein). The event source 104, the event source 106, and the event source 108 can be devices from which the event originated. For example, the event source can be the network node that is reporting that a performance degradation event (e.g., high memory usage) has occurred within itself. The event source 104, the event source 106, and the event source 108 can also be devices that receive notification of the events occurring at other devices. For example, the event source can be a server or management node coupled to the network node from which the event originated.

Figure 2:
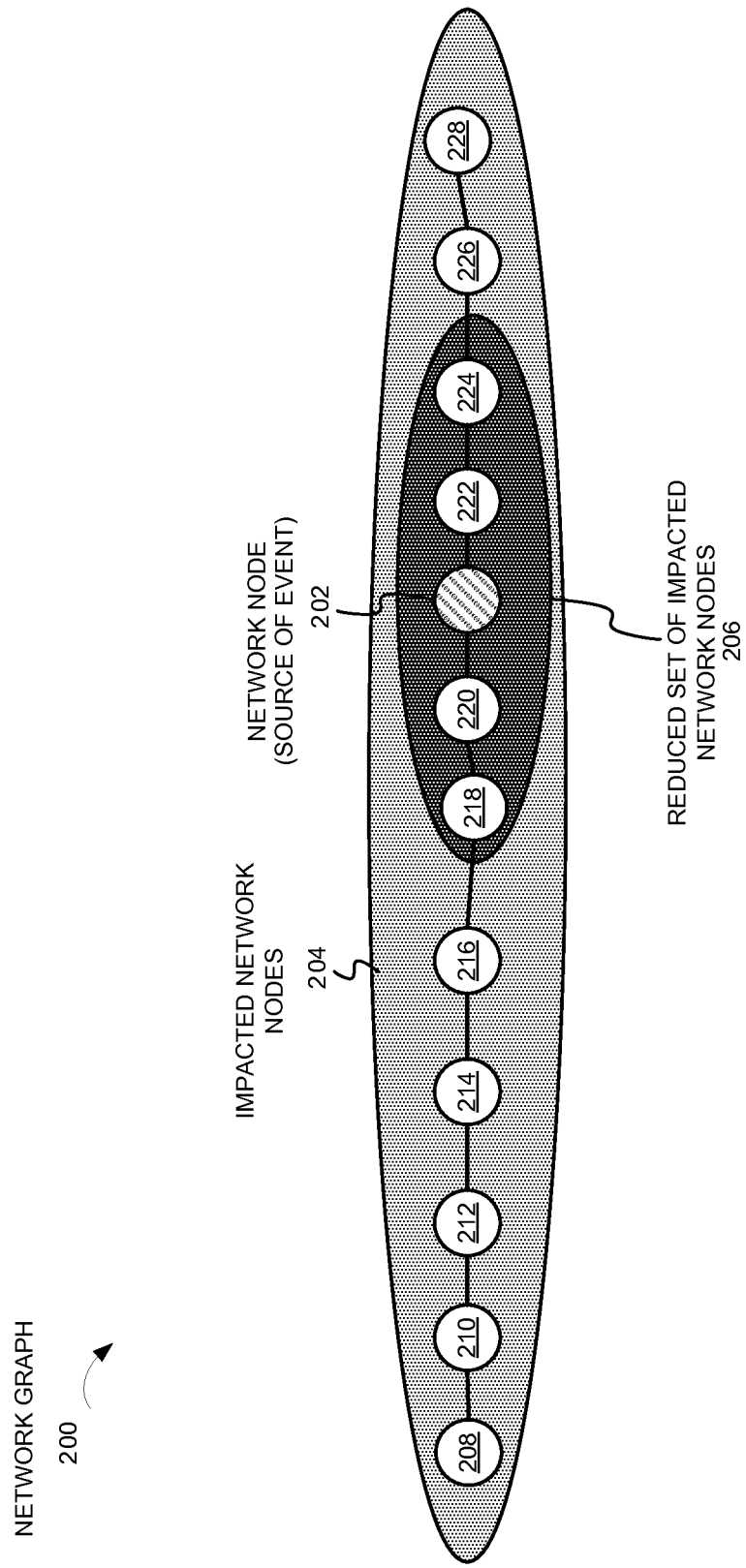
FIG. 2 depicts a first example network graph used for predictive cache priming, according to some embodiments.
Figure 3:
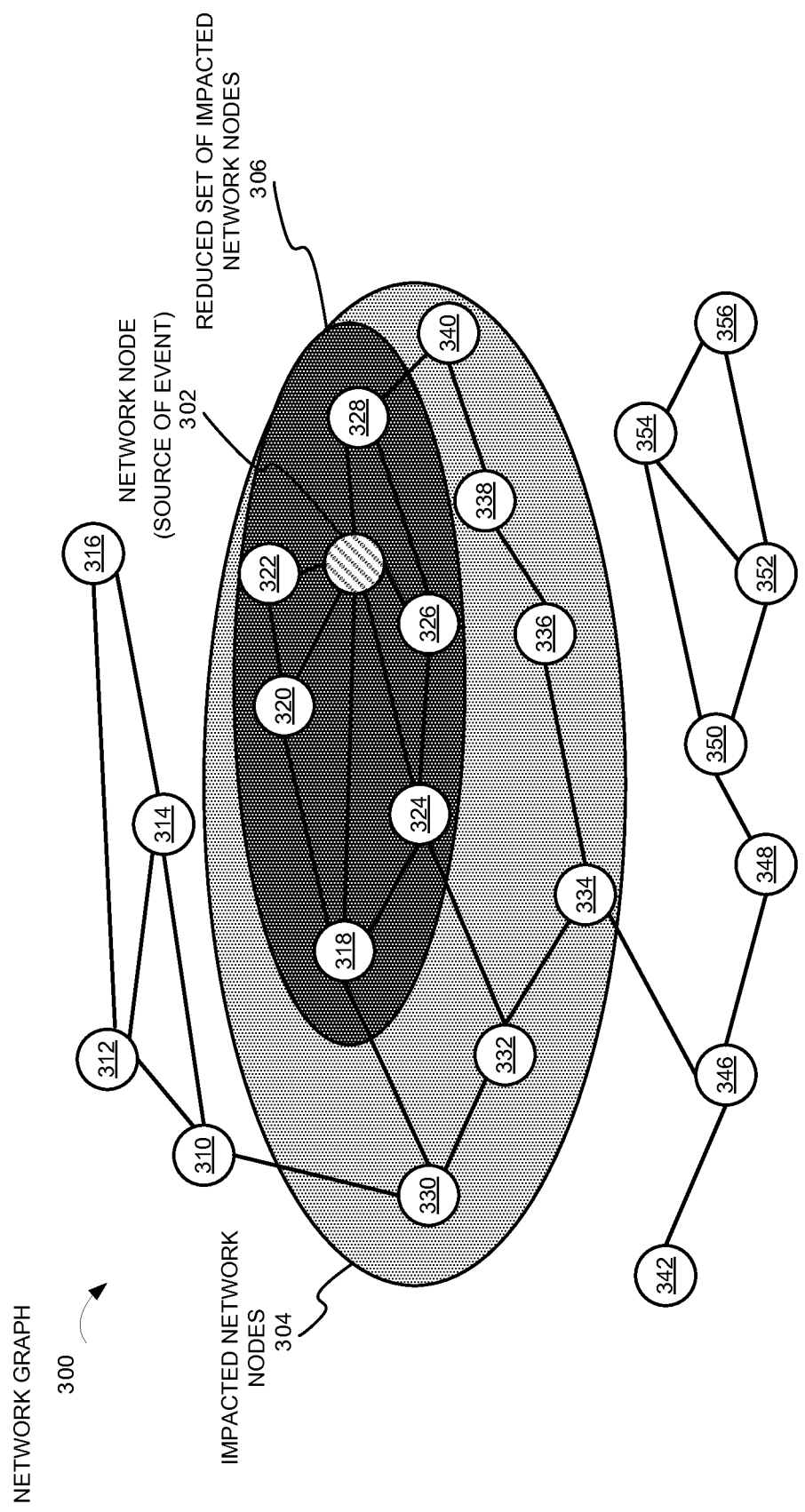
FIG. 3 depicts a second example network graph used for predictive cache priming, according to some embodiments.

The device 102 includes a persistent data storage 116, a cache prime module 118, a memory 112, network graphs 114, and an API interface 119 that are communicatively coupled together. The persistent data storage 116 can be a hard disk drive, such as magnetic storage device. The memory 112 can be different types of writable memory, such as Random Access Memory (RAM), FLASH, cache, etc. The cache prime module 118 can be software, hardware, firmware, or a combination thereof. The network graphs 114 include graphical representations of network nodes and their connectivity among each other in a network. A network node depicted or otherwise logically represented in a network graph can be a router, server, modem, bridge, hub, host computer, client device, etc. The connectivity among the network nodes can vary. Examples of network graphs 114 are depicted in FIGS. 2-3, which are described in more detail below. Although not shown, the network graphs 114 can be stored in various storage media (including the memory 112 and the persistent data storage 116). Also, the memory 112, the persistent data storage 116, and the cache prime module 118 are depicted as being in a same device. However, in some other embodiments, one or more of these components may be stored in separate devices.

The API clients 110, 111, and 115 can be different types of devices that provide an API for communication. For example, various devices can communicate with the API clients 110, 111, and 115 using different types of API calls. The API calls can include routines for receiving and transmitting of communications. The API clients 110, 111, and 115 can host a management service for management and possible correction of the network when a performance degradation event occurs. In response to receiving notification of a performance degradation event, the API clients 110, 111, and 115 can request attributes, status, etc. of network nodes that are impacted by the performance degradation event. The management service executing on the API clients 110, 111, and 115 can then provide a Graphical User Interface (GUI) to present the performance degradation event and attributes, status, etc. of network nodes impacted by the performance degradation event. An administrator using the GUI can monitor the performance degradation event and the impacted network nodes and can even provide solutions to correct the performance degradation. For example, a network node can be reset or taken offline, traffic in the network rerouted, etc. While described as being API-based devices, in some embodiments, the client devices can be any other type of device receiving the events and requesting for attributes, status, etc. of the impacted network nodes.

The API interface 119 is an interface (e.g., hardware and/or software) configured to provide communications between the device 102 and the API client 110, the API client 111, and the API client 115. The communication can be based on different types of protocols. The API interface 119 can be communicatively coupled to the API client 110, the API client 111, and the API client 115 over different types of networks (e.g., Local Area Networks (LANs), Wide Area Networks (WANs), etc.). In this example, the device 102 is configured to transmit events 120 to the API client 110 through the API interface 119. The API client 110 is configured to transmit a request 119 to the device 102 through the API interface 119. The device 102 is configured to transmit events 124 to the API client 111 through the API interface 119. The API client 111 is configured to transmit requests 122 to the device 102 through the API interface 119. The device 102 is configured to transmit events 128 to the API client 115 through the API interface 119. The API client 115 is configured to transmit requests 126 to the device 102 through the API interface 119. The events 120, 124, and 128 include notifications of events that were sent by the event sources 104, 106, or 108 to the device 102. The events can be different types of performance degradation events that occur at a network node. The requests 119, 122, and 126 include requests for data related to network nodes that are affected by the events. The data requested can include data that is copied from the persistent data storage 116 to the memory 112, as part of predictive cache priming (as further described below).

To further illustrate, FIG. 1 is annotated with a series of letters A-F. These letters represent operational stages. Although these stages are ordered for this example, the stages illustrate one example to aid in understanding this disclosure and should not be used to limit the claims. Subject matter falling within the scope of the claims can vary with respect to the order and some of the operations. For example, stages B-E can be executed at least partially in parallel with each other.

At stage A, the event source 104 transmits a performance degradation event signal to the device 102. The performance degradation event can be any type of event or occurrence at a network node that results in the network node not executing at its optimal performance or below some defined level of performance. For example, the performance degradation event can be the network node being shut down, non-operational, in a reset state, etc. In another example, the performance degradation event can be some type of event related to a memory in the network node. For example, the performance degradation event can be a level of usage of random access memory used by a processor that exceeds a usage threshold (e.g., greater than 90%, greater than 75%, greater than 50%, etc.). The performance degradation event can also be the level of usage of buffers or queues for storing data packets that are received by the network node or are to be transmitted from the network node having exceeded a usage threshold (e.g., greater than 90%, greater than 75%, greater than 50%, etc.). Another example of a performance degradation event can be a level of usage of a processor. For example, the amount of time the processor is executing instructions (versus sitting idle) as a percentage of the processor's capacity is determined. If this percentage is greater than a defined processor usage threshold, a performance degradation event can be triggered. In another example, the performance degradation event can relate to the throughput. For example, the performance degradation event can occur if the average amount of time a data packet received and then output from a network node is greater than a time threshold.

At stage B, notification of the performance degradation event is forwarded to one or more API clients. In this example, the notification is forwarded to the API client 110. The notification can be an API call that includes a notification of a performance degradation event (see the events 120).

At stage C, the cache prime module 118 retrieves the network graph (from the network graphs 114) associated with the network from which the performance degradation event originated. The network graph retrieved can be a graphical representation of at least part of the network that includes the network node from which the performance degradation event originated. Examples of the network graphs 114 are depicted in FIGS. 2-3, which are described in more detail below.

At stage D, the cache prime module 118 determines a set of impacted network nodes based on the network graph and the performance degradation event signal. For example, the set of impacted network nodes can include any network node that uses the network node where the performance degradation event occurred (the immediately impacted node) for data transmission in the network. To illustrate, if network node A transmits data packets to the immediately impacted node for forwarding to network node B, both network node A and network node B can be part of the set of impacted network nodes. Also, a network node is not required to be directly connected to the immediately impacted network node to be part of the set of impacted network nodes. Returning to the example above, if network node B is to transmit the data packets to network node C, network node C can be part of the set of impacted network nodes.

Also at stage D, the cache prime module 118 can reduce this set to a subset of impacted network nodes based on the size of the memory (the memory 112) used for the predictive prime caching. In particular, the cache prime module 118 can limit the size of the subset because the size of the memory 112 is limited by how much data regarding the subset of impacted network nodes can be stored therein. For example, available space in the memory 112 for storage of such data can restrict the subset to include data regarding 10 network nodes.

The cache prime module 118 can also reduce this set to a subset of impacted network nodes based on an attribute relevant to the problem domain that would help constrain the impact scope. An example of an attribute that would help constrain the impact scope can include the type of network node triggering the event. For example, if the network node is a central hub or bridge for communications among multiple network devices, the subset of the impacted network nodes can be larger. In contrast, if the network node is a terminal device that is limited on the number of network devices to which it communicates, the subset of the impacted network nodes can be smaller. Another example of an attribute that would help constrain the impact scope can include the type of device in the network node from which the event originated. For example, if the device is a processor used for processing of data packets, one set of network nodes can be in the subset of the impacted network nodes. If the device is a queue or buffer for storage of data packets received or to be transmitted, a different set of network nodes can be in the subset of the impacted network nodes.

Another example of an attribute that would constrain the impact scope can include the type of performance degradation. For example, if the performance degradation event is memory usage exceeding a threshold, a first set of network nodes can be in the subset of the impacted network nodes. If the performance degradation event is processor usage exceeding a threshold in a configuration that includes multiple processors, a second set (smaller than the first set) of network nodes can be in the subset of the impacted network nodes. Another example of an attribute that would help constrain the impact scope can include the number of ports of the network node from which the event originated. For example, if the number of ports is less than a port number threshold, a first set of network nodes can be in the subset of the impacted network nodes. If the number of ports is greater than the port number threshold, a second set (smaller than the first set) of network nodes can be in the subset of the impacted network nodes.

Another example of an attribute that would help constrain the impact scope can include the type of protocol being used for communications with the network node from which the event originated. For example, if a first type of protocol is used, a first set of network nodes can be in the subset of the impacted network nodes. If a second type of protocol is used, a second set of network nodes can be in the subset of the impacted network nodes. Another example of an attribute that would help constrain the impact scope can include the type of payload being communicated with the network node from which the event originated. For example, if the payload is high priority video streaming, a first set of network nodes can be in the subset of the impacted network nodes. If the payload is backup data to provide redundancy, a second set of network nodes can be in the subset of the impacted network nodes. Another example of an attribute that would help constrain the impact scope can include how a same event for a same device in a same or different network node narrowed the impact scope. Thus, the same narrowing can be used in response to the current event that was used in response to a previous event if the two events are the same type.

At stage E, the cache prime module 118 can retrieve, from the persistent data storage 116, data defining the subset of impacted network nodes for storage in the memory 112. The data can define any relevant attributes, activities, etc. of the impacted network nodes. For example, this data can include any data that an administrator may desire to view using an interface of the API client 110 to help view, diagnose, correct, etc. the network nodes impacted by the performance degradation event. Examples include status of memories or processors in the network nodes, data logs that include records of activity at the network nodes, amount of data packets received and/or transmitted by the network nodes, etc.

At stage F, the cache prime module 118 transmits the data (from the memory 112) defining the subset of impacted nodes to the API client 110, in response to a request from the API client 110 for the data. Thus, the cache priming operations define the subset of impacted nodes and copy data relevant to these impacted nodes from the slower persistent data storage to a faster memory in anticipation of the API client 110 requesting such data.

Example Network Graphs

FIG. 2 depicts a first example network graph used for predictive cache priming, according to some embodiments. FIG. 2 depicts a network graph 200 that represents connectivity among nodes in a network. The network graph 200 represents a serial-type node configuration.

The network graph 200 includes a network node 202, a network node 208, a network node 210, a network node 212, a network node 214, a network node 216, a network node 218, a network node 220, a network node 222, a network node 224, a network node 226, and a network node 228. The network node 208 is communicatively coupled to the network node 210. The network node 210 is communicatively coupled to the network node 212. The network node 212 is communicatively coupled to the network node 214. The network node 214 is communicatively coupled to the network node 216. The network node 216 is communicatively coupled to the network node 218. The network node 218 is communicatively coupled to the network node 220. The network node 220 is communicatively coupled to the network node 202. The network node 202 is communicatively coupled to the network node 222. The network node 222 is communicatively coupled to the network node 224. The network node 224 is communicatively coupled to the network node 226. The network node 226 is communicatively coupled to the network node 228.

In this example, the network node 202 is where the performance degradation event occurred. Also, each network node in the network graph 200 is logically categorized as part of a set of impacted network nodes 204 comprising the network node 202, the network node 208, the network node 210, the network node 212, the network node 214, the network node 216, the network node 218, the network node 220, the network node 222, the network node 224, the network node 226, and the network node 228. With reference to FIG. 1, because of the connectivity, the cache prime module 118 can determine that each of these network nodes uses or is otherwise logically associated with the network node where the performance degradation event occurred (the immediately impacted node) for data transmission in the network.

The cache prime module 118 can then reduce the set of impacted network nodes 204 to a subset of the impacted network nodes 206—a reduced set of impacted network nodes. In this example, the reduced set of impacted network nodes 206 includes the network node 218, the network node 220, the network node 202, the network node 222, and the network node 224. As described above, this reduction to a subset of the impacted network nodes can be based on different criteria (size of memory for caching, type of network node, type of performance degradation, etc.).

To further illustrate, FIG. 3 depicts a second example network graph used for predictive cache priming, according to some embodiments. FIG. 3 depicts a network graph 300 that represents connectivity among nodes in a network. The network graph 300 represents a mesh node configuration.

The network graph 300 includes a network node 302, a network node 310, a network node 312, a network node 314, a network node 316, a network node 318, a network node 320, a network node 322, a network node 324, a network node 326, a network node 328, a network node 330, a network node 332, a network node 334, a network node 336, a network node 338, a network node 340, a network node 342, a network node 346, a network node 348, a network node 350, a network node 352, a network node 354, and a network node 356.

The network node 310 is communicatively coupled to the network nodes 312, 314, and 330. The network node 312 is communicatively coupled to the network nodes 310, 314, and 316. The network node 314 is communicatively coupled to the network nodes 310, 312, and 316. The network node 316 is communicatively coupled to the network nodes 312 and 314.

The network node 318 is communicatively coupled to the network nodes 302, 320, 324, and 330. The network node 320 is communicatively coupled to the network nodes 302, 318, and 322. The network node 322 is communicatively coupled to the network nodes 302 and 320. The network node 324 is communicatively coupled to the network nodes 302, 318, 326, and 332. The network node 326 is communicatively coupled to the network nodes 302, 324, and 328. The network node 328 is communicatively coupled to the network nodes 302, 326, and 340.

The network node 330 is communicatively coupled to the network nodes 310, 318, and 332. The network node 332 is communicatively coupled to the network nodes 324, 330, and 334. The network node 334 is communicatively coupled to the network nodes 332, 336, and 346. The network node 336 is communicatively coupled to the network nodes 334 and 338. The network node 338 is communicatively coupled to the network nodes 336 and 340. The network node 340 is communicatively coupled to the network nodes 328 and 338.

The network node 342 is communicatively coupled to the network node 346. The network node 346 is communicatively coupled to the network nodes 334, 342, and 348. The network node 348 is communicatively coupled to the network nodes 346 and 350. The network node 350 is communicatively coupled to the network nodes 348, 352, and 354. The network node 352 is communicatively coupled to the network nodes 350, 354, and 356. The network node 354 is communicatively coupled to the network nodes 350, 352, and 356. The network node 356 is communicatively coupled to the network nodes 352 and 354.

The cache prime module 118 can reduce the set of impacted network nodes 304 to a subset of the impacted network nodes 306—a reduced set of impacted network nodes. In this example, the reduced subset of impacted network nodes 306 includes the network node 318, the network node 320, the network node 302, the network node 322, the network node 324, the network node 326, and the network node 328. As described above, this reduction to a subset of the impacted network nodes can be based on different criteria (size of memory for caching, type of network node, type of performance degradation, etc.).

Example Predictive Cache Priming Operations

Figure 4:
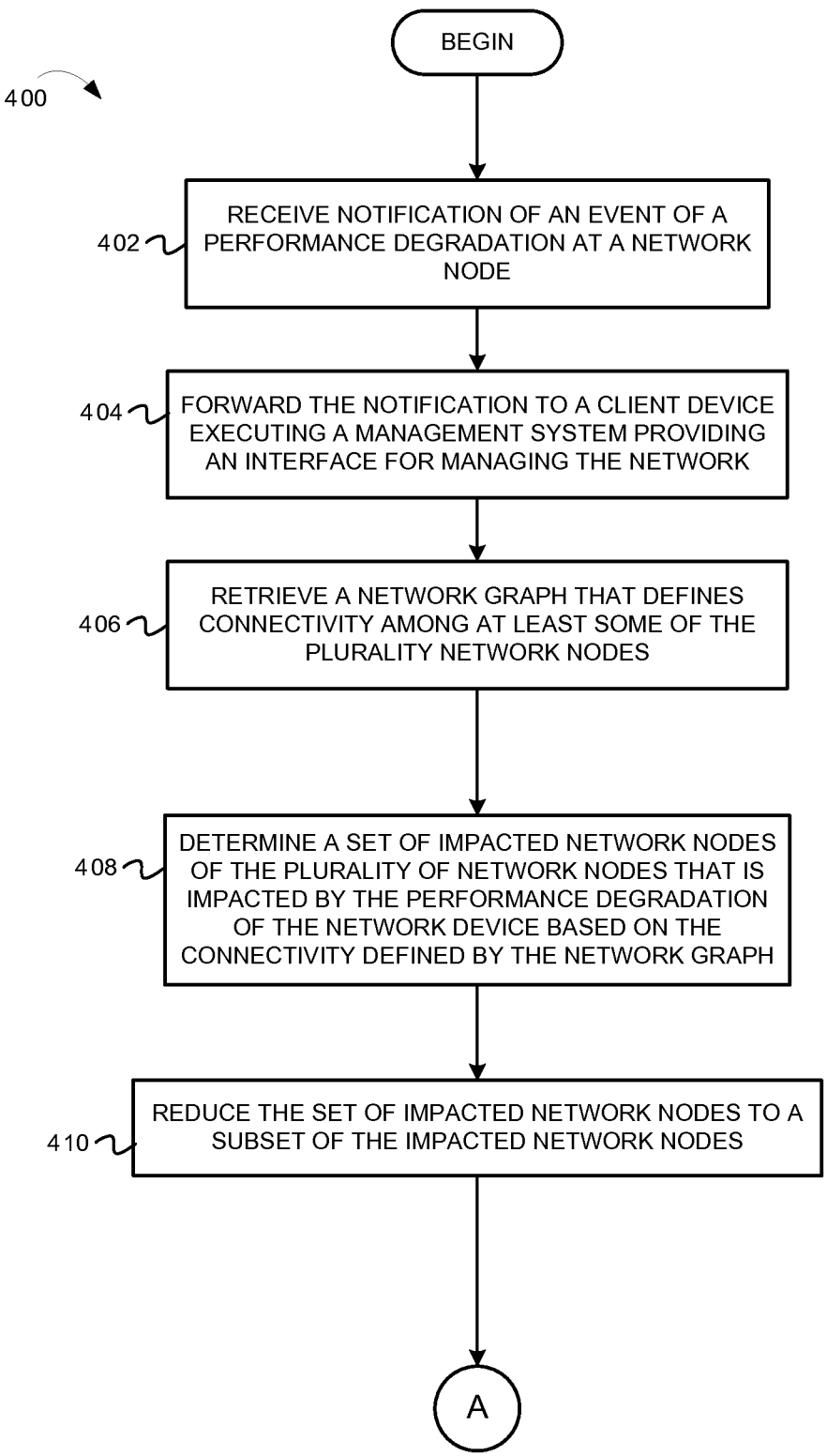
FIGS. 4-5 depict flowcharts for event-triggered graph centric predictive cache priming, according to some embodiments.
Figure 5:
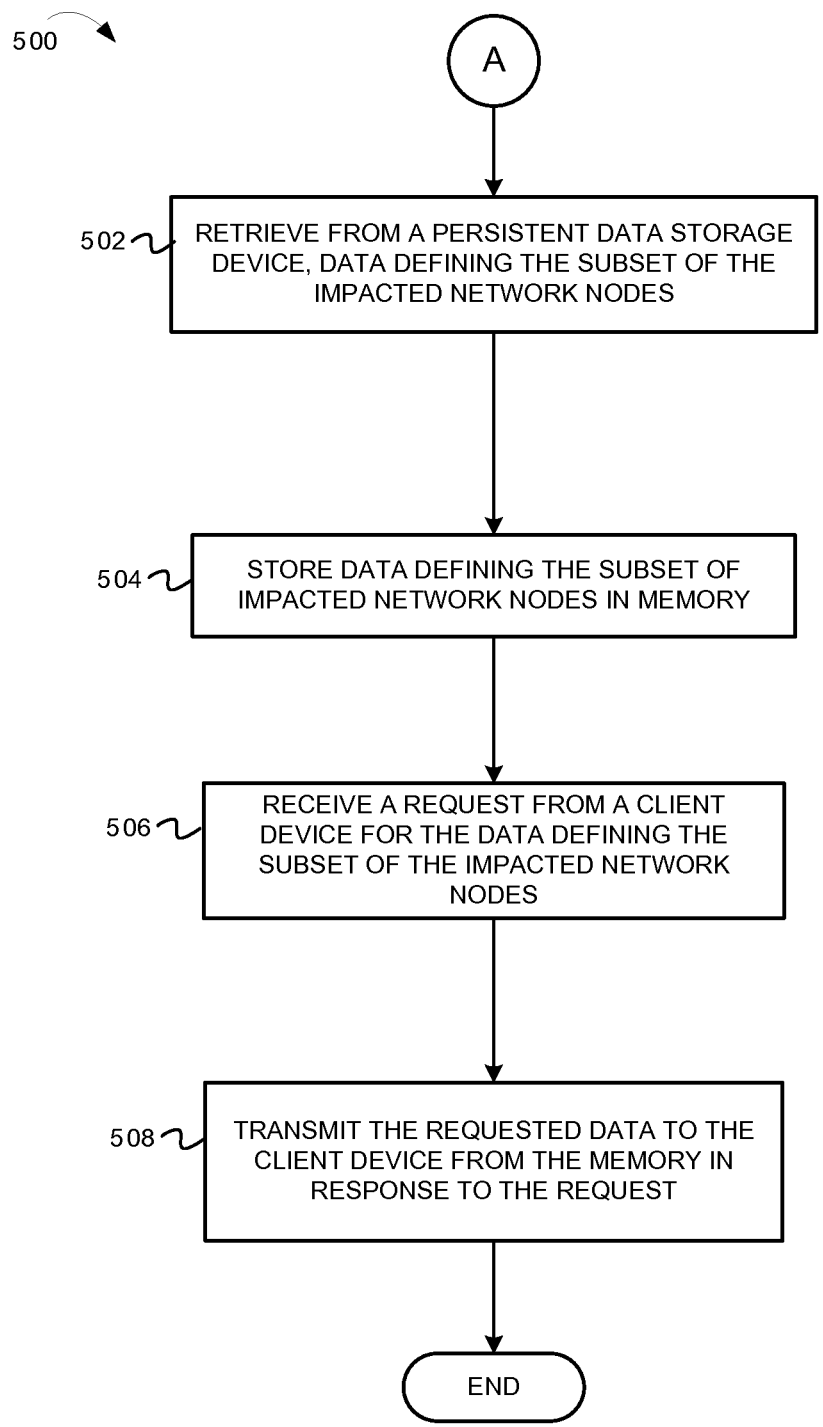

To further illustrate operations of the system 100 of FIG. 1, FIGS. 4-5 depict flowcharts for event-triggered graph centric predictive cache priming, according to some embodiments. A flowchart 400 of FIG. 4 and a flowchart 500 of FIG. 5 are described with reference to FIG. 1. Operations of the flowchart 400 continue through transition point A to operations of the flowchart 500. Operations of the flowchart 400 and the flowchart 500 can be performed by software, firmware, hardware or a combination thereof (see for example the cache prime module 118 in FIG. 1). The operations of the flowchart 400 start at block 402.

The cache prime module 118 receives notification of an event of performance degradation at a network node (402). For example, the event source 104 transmits a performance degradation event signal to the device 102. As described above, the performance degradation event can be any type of event or occurrence at a network node that results in the network node not executing at its optimal performance or below some defined level of performance.

The device 102 then forwards the notification of the event to client device executing a management system providing an interface to manage the network (404). With reference to FIG. 1, the device 102 forwards the notification to the API client 110. The notification can be an API call that includes a notification of a performance degradation event (see the events 120).

The cache prime module 118 retrieves a network graph that defines connectivity among at least some of the network nodes in the network (406). The network can include a group of network nodes within a logical grouping. For example, all network nodes in a same LAN would be in a same network. Alternatively, some lesser group of network nodes can be defined as a network. In some embodiments, each network node is in only one network. Thus, the cache prime module 118 is able to retrieve the correct network graph based on the identity of the network node where the performance degradation event occurred. The network graph retrieved can be a graphical or otherwise logically associative representation of at least part of the network that includes the network node from which the performance degradation event originated (see examples depicted in FIGS. 2-3 described above).

The cache prime module 118 determines a set of impacted network nodes of the plurality of network nodes that is impacted by the performance degradation of the network device based on the performance degradation event signal and the connectivity defined by the network graph (408). For example, the set of impacted network nodes can include any network node that uses the network node where the performance degradation event occurred (the immediately impacted node) for data transmission in the network. To illustrate, if network node A transmits data packets to the immediately impacted node for forwarding to network node B, both network node A and network node B can be part of the set of impacted network nodes. Also, a network node is not required to be actually connected to the immediately impacted network node to be part of the set of impacted network nodes. Returning to the example above, if network node B is to transmit the data packets to network node C, network node C can be part of the set of impacted network nodes.

The cache prime module 118 also reduces the set of impacted network nodes to a subset of the impacted network nodes (410). The cache prime module 118 can reduce this set to a subset of impacted network nodes based on the size of the memory (the memory 112) used for the predictive prime caching and an attribute relevant to the problem domain that would help constrain the impact scope. Different examples of attributes that would help constrain the impact scope include those examples described above.

Operations of the flowchart 400 continue at transition point A, which continues at transition point A in the flowchart 500 of FIG. 5 (which is now described).

The cache prime module 118 retrieves from a persistent data storage device, data defining the subset of the impacted network nodes (502). The cache prime module 118 can retrieve, from the persistent data storage 116, data defining the subset of impacted network nodes for storage in the memory 112. As described above, the data can define any relevant attributes, activities, etc. of the impacted network nodes.

The cache prime module 118 then stores the data defining the subset of impacted network nodes in the memory (504). With reference to FIG. 1, the cache prime module 118 stores the data retrieved from the persistent data storage 116 into the memory 112.

The cache prime module 118 receives a request from a client device for the data defining the subset of the impacted network nodes (506). With reference to FIG. 1, the cache prime module 118 can receive a request from the API client 110 for the data stored in the memory 112. The API client 110 can transmit this request in response to receiving notification of the performance degradation event that originated from one of the event sources. For example, an administrator using a management interface for monitoring the network through the API client 110 may request the data that was cached into the memory 112 from the persistent data storage 116 (in anticipation of receiving this request).

The cache prime module 118 transmits the requested data to the client device from the memory in response to the request (508). Thus, the cache priming operations define the subset of impacted nodes and copy data relevant to these impacted nodes from the slower persistent data storage to a faster memory in anticipation of the API client 110 requesting such data.

Example Computer Device

Figure 6:
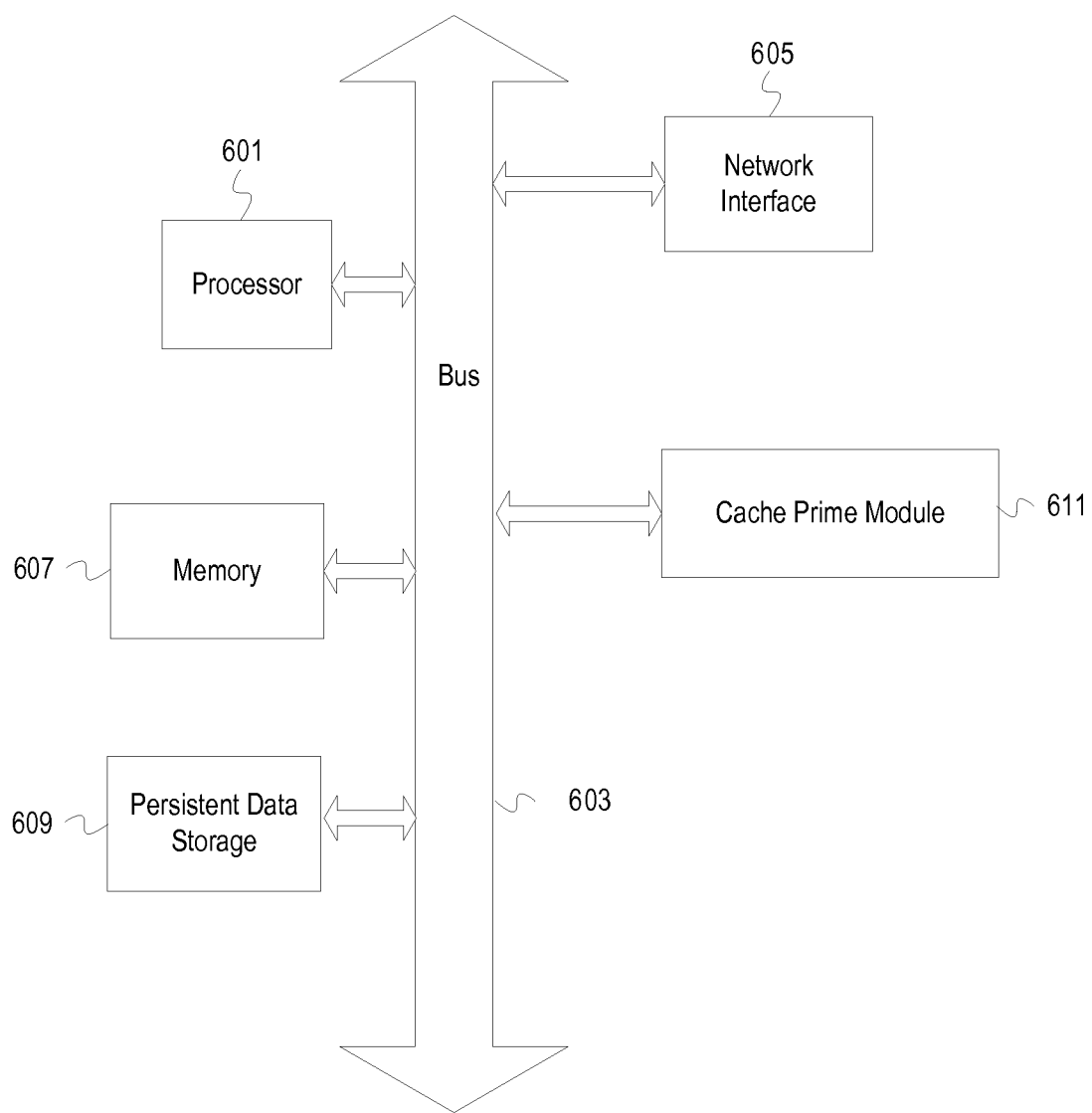
FIG. 6 depicts an example computer device, according to some embodiments.

FIG. 6 depicts an example computer device, according to some embodiments. The computer device includes a processor 601 (possibly including multiple processors, multiple cores, multiple nodes, and/or implementing multi-threading, etc.). The computer device includes memory 607. The memory 607 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. For example, the memory 607 can represent the memory 112 depicted in FIG. 1.

The computer device also includes a persistent data storage 609. The persistent data storage 609 can be a hard disk drive, such as magnetic storage device. The persistent data storage 609 can be the persistent data storage 116 depicted in FIG. 1.

The computer device also includes a bus 603 (e.g., PCI, ISA, PCI-Express, HyperTransport® bus, InfiniBand® bus, NuBus, etc.) and a network interface 605 (e.g., a Fiber Channel interface, an Ethernet interface, an internet small computer system interface, SONET interface, wireless interface, etc.). The network interface 605 can include the API interface 119 depicted in FIG. 1.

The computer device also includes a cache prime module 611. The cache prime module 611 can perform the cache priming, as described above. Any one of the previously described functionalities may be partially (or entirely) implemented in hardware and/or on the processor 601. For example, the functionality may be implemented with an application specific integrated circuit, in logic implemented in the processor 601, in a co-processor on a peripheral device or card, etc. Further, realizations may include fewer or additional components not illustrated in FIG. 6 (e.g., video cards, audio cards, additional network interfaces, peripheral devices, etc.). The processor 601, the network interface 605, and the persistent data storage 609 are coupled to the bus 603. Although illustrated as being coupled to the bus 603, the memory 607 may be coupled to the processor 601.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

While the aspects of the disclosure are described with reference to various implementations and exploitations, it will be understood that these aspects are illustrative and that the scope of the claims is not limited to them. In general, techniques for cache priming as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

What is claimed is:

1. A method comprising:
    based on receipt of a notification corresponding to performance degradation in a first network node in a network, retrieving a network graph that defines connectivity of at least a subset of network nodes in the network including the first network node;
    determining a set of impacted network nodes, wherein the set of impacted network nodes are network nodes of the subset of network nodes impacted by the performance degradation based on the connectivity defined by the network graph;
    reducing the set of impacted network nodes to a subset of the impacted network nodes; and
    priming cache of a device with data defining the subset of the impacted network nodes, wherein the device received the notification and comprises a persistent storage device that stored the data defining the subset of impacted network nodes and the device hosts a network management interface to at least one client.

2. The method of claim 1, wherein reducing the set of impacted network nodes comprises reducing the set of impacted network nodes based, at least in part, on a type of the network node.

3. The method of claim 1, wherein reducing the set of impacted network nodes comprises reducing the set of impacted network nodes based, at least in part, on a type of the performance degradation.

4. The method of claim 1, wherein reducing the set of impacted network nodes comprises reducing the set of impacted network nodes based, at least in part, on a size of the cache.

5. The method of claim 1, wherein reducing the set of impacted network nodes comprises reducing the set of impacted network nodes based, at least in part, on a proximity of the first network node to each of the set of impacted network nodes.

6. The method of claim 1, further comprising:
    retrieving from the cache the data defining the subset of the impacted network nodes; and
    transmitting at least a portion of the retrieved data to the client that requested data about the performance degradation after the device forwarded the notification to the client.

7. The method of claim 6, wherein the retrieved data and the request from the client are communicated via the network management interface.

8. The method of claim 1, wherein priming the cache with the data defining the subset of the impacted network nodes comprises retrieving from the persistent storage device the data defining the subset of the impacted network nodes and writing the data defining the subset of the impacted network nodes into the cache, wherein the cache is memory of the device with a lower latency than the persistent storage device.

9. The method of claim 1, wherein the data defining the subset of the impacted network nodes comprises at least one of attributes and activities of the subset of the impacted network nodes.

10. One or more non-transitory machine-readable storage media having program code for cache priming stored therein, the program code comprising instructions to:
    based on receipt of a notification corresponding to a performance degradation in a first network node in a network, retrieve a network graph that defines connectivity of at least a subset of network nodes in the network including the first network node;
    determine a set of impacted network nodes, wherein the set of impacted network nodes are network nodes of the subset of network nodes impacted by the performance degradation based on the connectivity defined by the network graph;
    reduce the set of impacted network nodes to a subset of the impacted network nodes; and
    prime cache of a device with data defining the subset of the impacted network nodes in in anticipation of a request corresponding to the performance degradation.

11. The one or more non-transitory machine-readable storage media of claim 10, wherein the instructions to reduce the set of impacted network nodes comprises instructions to reduce the set of impacted network nodes based on at least one of a type of the performance degradation, a type of the first network node, a type of a component or device of the first network node, and size of the cache.

12. An apparatus comprising:
    a processor;
    a first machine-readable medium; and
    a second machine-readable medium having program code executable by the processor to cause the apparatus to:
        based on receipt of a notification corresponding to a performance degradation in a network node in a network, retrieve a network graph that defines connectivity of at least a subset of network nodes in the network including the first network node;
        determine a set of impacted network nodes, wherein the set of impacted network nodes are network nodes of the subset of network nodes impacted by the performance degradation based on the connectivity defined by the network graph;
        reduce the set of impacted network nodes to a subset of the impacted network nodes; and
        prime cache of the apparatus with data defining the subset of the impacted network nodes.

13. The apparatus of claim 12, wherein the program code executable by the processor to cause the apparatus to reduce the set of impacted network nodes comprises program code executable by the processor to cause the apparatus to reduce the set of impacted network nodes based, at least in part, on a type of the network node.

14. The apparatus of claim 12, wherein the program code executable by the processor to cause the apparatus to reduce the set of impacted network nodes comprises program code executable by the processor to cause the apparatus to reduce the set of impacted network nodes based, at least in part, on a type of the performance degradation.

15. The apparatus of claim 12, wherein the program code executable by the processor to cause the apparatus to reduce the set of impacted network nodes comprises program code executable by the processor to cause the apparatus to reduce the set of impacted network nodes based, at least in part, on a size of the cache.

16. The apparatus of claim 12, wherein the program code executable by the processor to cause the apparatus to reduce the set of impacted network nodes comprises program code executable by the processor to cause the apparatus to reduce the set of impacted network nodes based, at least in part, on a proximity of the first network node to each of the set of impacted network nodes.

17. The apparatus of claim 12, wherein the program code executable by the processor comprises program code executable by the processor to cause the apparatus to:
    retrieve, from the cache, the data defining the subset of the impacted network nodes in response to a request from a client; and
    transmit at least a portion of the data defining the subset of the impacted network nodes to the client that requested data about the performance degradation after the device forwarded the notification to the client.

18. The apparatus of claim 12, wherein the program code executable by the processor to cause the apparatus to prime the cache with the data defining the subset of the impacted network nodes comprises program code executable by the processor to cause the apparatus to retrieve from the first machine-readable medium the data defining the subset of the impacted network nodes and to write the data defining the subset of the impacted network nodes into the cache, wherein the cache has a lower latency than the first machine-readable medium.

19. The apparatus of claim 12, wherein the data defining the subset of the impacted network nodes comprises at least one of attributes and activities of the subset of the impacted network nodes.

20. The apparatus of claim 12, wherein the second machine-readable medium includes the cache.

* * * * *